United States Patent
Thornewell et al.

(10) Patent No.: US 9,843,554 B2
(45) Date of Patent: Dec. 12, 2017

(54) METHODS FOR DYNAMIC DNS IMPLEMENTATION AND SYSTEMS THEREOF

(75) Inventors: Peter M. Thornewell, Seattle, WA (US); Jason Haworth, Lynnwood, WA (US); Ian Smith, Middletown, NY (US); Nat Thirasuttakorn, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/397,610

(22) Filed: Feb. 15, 2012

(65) Prior Publication Data
US 2013/0212240 A1    Aug. 15, 2013

(51) Int. Cl.
*G06F 15/16* (2006.01)
*H04L 29/12* (2006.01)

(52) U.S. Cl.
CPC ........ *H04L 61/1511* (2013.01); *H04L 61/251* (2013.01)

(58) Field of Classification Search
CPC .................................................... H04L 61/251
USPC ........................................................ 709/223
See application file for complete search history.

(56) References Cited

U.S. PATENT DOCUMENTS

| | | | |
|---|---|---|---|
| 5,958,053 A | 9/1999 | Denker | |
| 6,119,234 A | 9/2000 | Aziz et al. | |
| 6,839,850 B1 | 1/2005 | Campbell et al. | |
| 7,028,182 B1 | 4/2006 | Killcommons | |
| 7,299,491 B2 | 11/2007 | Shelest et al. | |
| 7,441,429 B1 | 10/2008 | Nucci et al. | |
| 7,620,733 B1 | 11/2009 | Tzakikario et al. | |
| 7,921,211 B2 | 4/2011 | Larson et al. | |
| 7,941,517 B2 | 5/2011 | Migault et al. | |
| 8,266,427 B2 | 9/2012 | Thubert et al. | |

(Continued)

FOREIGN PATENT DOCUMENTS

WO    2009052668 A1    10/2007

OTHER PUBLICATIONS

Bau et al., "A Security Evaluation of DNSSEC with NSEC3," Mar. 2, 2010; updated version corrects and supersedes a paper in the NDSS' 10 proceedings, pp. 1-17.

(Continued)

*Primary Examiner* — Hamza Algibhah
(74) *Attorney, Agent, or Firm* — LeClairRyan, a Professional Corporation

(57) ABSTRACT

A method, computer readable medium, and device for dynamic DNS implementation, comprises receiving, at a network traffic management device, a first DNS response from a DNS server, wherein the first DNS response is compliant with Internet Protocol version 4 (IPv4). The first DNS response corresponds to a first DNS request from a client device being compliant with Internet Protocol version 6 (IPv6). The first DNS response is converted into a DNS second response that is compliant with IPv6, by attaching a prefix that identifies a network gateway device which is to handle receive subsequent non-DNS requests from the client device. The second DNS response is routed to the client device. Subsequent non-DNS requests from the client device that contain at least a part of the prefix allow the network traffic management device to route the non-DNS request through the designated network gateway device.

20 Claims, 4 Drawing Sheets

(56) References Cited

U.S. PATENT DOCUMENTS

| | | | |
|---|---|---|---|
| 8,281,383 | B2 | 10/2012 | Levy-Abegnoli et al. |
| 8,289,968 | B1* | 10/2012 | Zhuang .................. 370/392 |
| 9,106,699 | B2 | 8/2015 | Thornewell et al. |
| 2002/0103916 | A1 | 8/2002 | Chen et al. |
| 2003/0074434 | A1 | 4/2003 | Jason et al. |
| 2003/0221000 | A1 | 11/2003 | Cherkasova et al. |
| 2005/0028010 | A1 | 2/2005 | Wallman |
| 2005/0125195 | A1 | 6/2005 | Brendel |
| 2006/0288413 | A1 | 12/2006 | Kubota |
| 2007/0214503 | A1 | 9/2007 | Shulman et al. |
| 2008/0137659 | A1 | 6/2008 | Levy-Abegnoli et al. |
| 2008/0205415 | A1 | 8/2008 | Morales |
| 2008/0271132 | A1 | 10/2008 | Jokela et al. |
| 2008/0304457 | A1 | 12/2008 | Thubert et al. |
| 2009/0187649 | A1 | 7/2009 | Migault et al. |
| 2009/0271865 | A1 | 10/2009 | Jiang |
| 2010/0034381 | A1 | 2/2010 | Trace et al. |
| 2010/0036959 | A1 | 2/2010 | Trace et al. |
| 2010/0061380 | A1* | 3/2010 | Barach et al. ............ 370/400 |
| 2010/0077462 | A1 | 3/2010 | Joffe et al. |
| 2010/0142382 | A1 | 6/2010 | Jungck et al. |
| 2010/0217890 | A1* | 8/2010 | Nice et al. .............. 709/245 |
| 2010/0228813 | A1* | 9/2010 | Suzuki et al. ........... 709/203 |
| 2010/0274885 | A1* | 10/2010 | Yoo et al. ............... 709/224 |
| 2010/0325264 | A1 | 12/2010 | Crowder et al. |
| 2011/0038377 | A1* | 2/2011 | Haddad ................ 370/395.53 |
| 2011/0055921 | A1 | 3/2011 | Narayanaswamy et al. |
| 2011/0154132 | A1 | 6/2011 | Aybay |
| 2011/0211553 | A1* | 9/2011 | Haddad .................. 370/331 |
| 2011/0282997 | A1 | 11/2011 | Prince et al. |
| 2011/0283018 | A1 | 11/2011 | Levine et al. |
| 2011/0292857 | A1* | 12/2011 | Sarikaya et al. ........... 370/312 |
| 2011/0307629 | A1* | 12/2011 | Haddad .................. 709/245 |
| 2012/0005372 | A1* | 1/2012 | Sarikaya et al. ........... 709/245 |
| 2012/0047571 | A1 | 2/2012 | Duncan et al. |
| 2012/0054497 | A1 | 3/2012 | Korhonen |
| 2012/0059934 | A1* | 3/2012 | Rafiq et al. ............. 709/225 |
| 2012/0071131 | A1 | 3/2012 | Zisapel et al. |
| 2012/0110210 | A1* | 5/2012 | Huang et al. ............ 709/246 |
| 2012/0117379 | A1* | 5/2012 | Thornewell et al. ........ 713/155 |
| 2012/0174217 | A1 | 7/2012 | Ormazabal |
| 2012/0259998 | A1* | 10/2012 | Kaufman ............ H04L 61/1511 709/245 |
| 2012/0284296 | A1* | 11/2012 | Arifuddin et al. ........... 707/769 |
| 2013/0007870 | A1 | 1/2013 | Devarajan et al. |
| 2013/0100815 | A1* | 4/2013 | Kakadia et al. ............ 370/237 |
| 2013/0103805 | A1* | 4/2013 | Lyon .................. 709/219 |
| 2013/0151725 | A1* | 6/2013 | Baginski et al. ........... 709/245 |
| 2013/0166715 | A1* | 6/2013 | Yuan et al. ............. 709/223 |
| 2013/0201999 | A1* | 8/2013 | Savolainen et al. ......... 370/467 |
| 2013/0205035 | A1* | 8/2013 | Chen ................ 709/230 |
| 2013/0205040 | A1* | 8/2013 | Naor et al. ............. 709/238 |
| 2013/0335010 | A1 | 12/2013 | Wu et al. |
| 2013/0340079 | A1 | 12/2013 | Gottlieb et al. |
| 2014/0376470 | A1* | 12/2014 | Mahkonen ............ H04W 8/18 370/329 |

OTHER PUBLICATIONS

F5 Networks Inc., "BIG-IP® Global Traffic Manager," F5 Networks Inc., <http://www.f5.com/products/big-ip/product-modules/global-traffic-manager.html>, last accessed Jul. 6, 2010, 2 pages.

F5 Networks Inc., "BIG-IP® Global Traffic Manager™ and BIG-IP Link Controller™: Implementations," Manual 0304-00, Dec. 3, 2009, pp. 1-161, version 10.1, F5 Networks, Inc.

F5 Networks Inc., "BIG-IP® Systems: Getting Started Guide," Manual 0300-00, Feb. 4, 2010, pp. 1-102, version 10.1, F5 Networks, Inc.

F5 Networks Inc., "Detail Requirement Report: RQ-GTM-0000024," <http://fpweb/fptopic.asp?REQ=RQ-GTM-0000024>, F5 Networks, Inc., 1999, printed Mar. 31, 2010, 2 pages.

F5 Networks Inc., "Detail Requirement Report: RQ-GTM-0000028," <http://fpweb/fptopic.asp?REQ=RQ-GTM-0000028>, F5 Networks, Inc., 1999, printed Mar. 31, 2010, 2 pages.

"DNS DDOS Protection Functional Spec," BigipDNSDDOSProtectionFS<TMO<TWiki, last accessed Mar. 31, 2010, 2 pages.

"DNSSEC Functional Spec," TMOSDnsSECFS<TMOS<TWiki, last accessed on Mar. 31, 2010, pp. 1-10.

F5 Networks Inc., "DNS Security (DNSSEC) Solutions," <http://www.f5.com/solutions/security/dnssec>, F5 Networks, Inc., printed Aug. 23, 2010, pp. 1-4.

"DNSX; DNSX Secure Signer; DNSSEC Management Solution," <http://www.xelerance.com/dnssec>.pp. 1-9.

F5 Networks Inc., "F5 and Infoblox Provide Customers with Complete DNS Security Solution," <http://www.f5.com/news-press-events/press/2010/20100301.html>, Mar. 1, 2010, 2 pages, F5 Networks, Inc., Seattle and Santa Clara, California.

F5 Networks Inc., "F5 Solutions Enable Government Organizations to Meet 2009 DNSSEC Compliance," .<http://www.f5.com/news-press-events/press/2009/20091207.html>, Dec. 7, 2009, 2 pages, F5 Networks, Inc., Seattle, California.

Higgins, Kelly Jackson, "Internet Infrastructure Reaches Long-Awaited Security Milestone," Tech Center: Security Services, <http//www.darkreading.com/securityservices/security/management/showArticle.jhtml?article>, Jul. 28, 2010. pp. 1-4.

Howarth, Fran, "Investing in security versus facing the consequences," White Paper, Bloor Research, Sep. 2010, pp. 1-15.

Laurie et al., "DNS Security (DNSSEC) Hashed Authenticated Denial of Existence," Network Working Group, RFC 5155, Feb. 2008, pp. 1-51.

MacVittie, Lori, "It's DNSSEC Not DNSSUX," DevCentral>Weblogs, <http://devcentral.f5.com/weblogs/macvittie/archive/2009/11/18/itrsquos-dnssec-not-dnssux.aspx>, posted on Nov. 18, 2009, accessed on Jul. 6, 2010, pp. 1-3.

"PDR/CDR for RQ-GTM-0000028," BigipDNSDDOSProtectionPDR<TMOS<TWiki, last accessed on Mar. 31, 2010, pp. 1-14.

"Secure64 DNS Signer," <www.secure64.com>, 2 pages.

Silva, Peter, "DNSSEC: The Antidote to DNS Cache Poisoning and Other DNS Attacks," F5 Technical Brief, 2009, pp. 1-10.

"Who is Xelerance," <http://www.xelerance.com>, slides 1-6.

Arends R., et al., "DNS Security Introduction and Requirements", Network Working Group, RFC 4033, Mar. 2005, pp. 1-20.

Arends R., et al., "Protocol Modifications for the DNS Security Extensions", Network Working Group, RFC 4035, Mar. 2005, pp. 1-50.

Arends R., et al., "Resource Records for the DNS Security Extensions", Network Working Group, RFC 4034, Mar. 2005, pp. 1-28.

Aura T., "Cryptographically Generated Addresses (CGA)", Network Working Group, RFC 3972, Mar. 2005, pp. 1-21.

Carpenter, B., "Transmission of IPv6 over IPv4 Domains without Explicit Tunnels", Network Working Group, RFC 2529, Mar. 1999, pp. 1-10.

Eastlake D., "Domain Name System Security Extensions", Network Working Group, RFC 2535, Mar. 1999, pp. 1-44.

Tatipamula M., et al., "IPv6 Integration and Coexistence Strategies for Next-Generation Networks", IEEE Communications Magazine, Jan. 2004, pp. 88-96.

Thomson, S., "DNS Extensions to Support IP Version 6", Network Working Group, Oct. 2006, pp. 1-9.

Wikipedia, "Domain Name System Security Extensions", last accessed, Jun. 3, 2010, pp. 1-20, (http://en.wikipedia.org/wiki/DNSSEC).

Wikipedia, "IPv6", last accessed, Jun. 3, 2010, p. 1, (http://en.wikipedia.org/wiki/IPv6).

Kaminsky, D., "Black Ops of Fundamental Defense", Recursion Ventures, 2010, pp. 1-116, (www.recursion.com).

Bagnulo, M., et al., "DNS64: DNS extensions for Network Address Translation from IPv6 Clients to IPv4 Servers draft-ietf-behave-dns64-10", BEHAVE WG, Jul. 5, 2010, pp. 1-31.

Hagino J., et al., "An IPv6-to-IPv4 Transport Relay Translator", Network Working Group, RFC 3142, Jun. 2001, pp. 1-11.

"DNSSEC Ready for Prime Time", Forrester Consulting, Jul. 2010, pp. 1-22, Cambridge, MA.

International Search Report and Written Opinion for International Patent Application No. PCT/US2013/026478 (dated Jun. 3, 2013).

(56) References Cited

OTHER PUBLICATIONS

Zhang, D., et al., "Considerations on NAT64 Load-Balancing draft-zhang-behave-nat64-load-balancing-03", Network Working Group, Jul. 11, 2011, pp. 1-17, Huawei Technologies Co.,Ltd.

Li, Z., et al., "Recommendation for DNS64-based NAT64 Round Robin Load-balancing draft-li-behave-dns64-load-balancing-02" behave, Internet-Draft, Oct. 31, 2011, pp. 1-11.

Bagnulo,M., et al., "DNS64: DNS Extensions for Network Address Translation from IPv6 Clients to IPv4 Servers", Internet Engineering Task Force (IETF), Apr. 2011, pp. 1-32.

\* cited by examiner

METHODS FOR DYNAMIC DNS IMPLEMENTATION AND SYSTEMS THEREOF

TECHNOLOGICAL FIELD

This technology generally relates to network communications, and more particularly, to systems and methods for dynamic DNS implementation.

BACKGROUND

The rapid exhaustion of Internet Protocol version 4 (IPv4) address space, despite conservation techniques, has prompted the Internet Engineering Task Force (IETF) to explore new technologies to expand the Internet's addressing capability. The permanent solution was deemed to be a redesign of the Internet Protocol itself. This next generation of the Internet Protocol, aimed to replace IPv4 on the Internet, was eventually named Internet Protocol Version 6 (IPv6) in 1995, in which the address size was increased from 32 to 128 bits or 16 octets. Mathematically, the new address space provides the potential for a maximum of $2^{128}$, or about $3.403 \times 10^{38}$ unique addresses. However, not all devices are IPv6 compliant and translation between IPv6 and IPv4, if at all possible, is fixed or static for various network devices. Examples of such devices that are still deployed on IPv4 platform are home networking routers, voice over Internet Protocol (VoIP) and multimedia equipment, and network peripherals. Although this list is not exhaustive in nature, other devices exist that operate on IPv4 only.

DNS64 is an exemplary mechanism for synthesizing 'AAAA' records (or, quad-A records) used in IPv6 from 'A' records used in IPv4. DNS64 is used with an IPv6/IPv4 translator to enable client-server communication between an IPv6-only client device and an IPv4-only server, without requiring any changes to either the IPv6 or the IPv4 node, for the class of applications that work through Network Address Translators (NATs). Conventional implementations of DNS64 map an IPv4 internet device into an IPv6 space using a well known static 96 bit IPv6 prefix. The composite IPv6 address, which includes the IPv4 address and the 96-bit prefix, is then later translated by a NAT device into the expected IPv4 address, whereby the connection is then routed across the IPv4 internet. This is done for all subsequent requests from an IPv6 client device to IPv4 servers. Unfortunately, the fixed IPv6 96-bit prefix is analogous to setting up static entries in Domain Name System (DNS) such that there can be only one NAT device (or set of NAT devices) that can be utilized to terminate the traffic. Thus, the IPv6 96-bit prefix is not a flexible or dynamic way to implement DNS64.

An alternative conventional solution is to use IPv6 'AnyCast' in which datagrams from a single sender are routed to the topologically nearest node in a group of potential receivers having the same destination address. However, using IPv6 'AnyCast' network addressing and routing methodology is problematic, because a failure of one device will cascade all traffic onto another device, thereby likely overloading it too. Further, IPv6 'AnyCast' still has fixed addresses within the group of potential receivers. Unfortunately, the above conventional technologies are not intelligent or flexible in their performance of converting between IPv6 and IPv4 devices.

What is needed is a system and method which is intelligent and flexible in converting communications between IPv6 and IPv4 network devices.

SUMMARY

In an aspect, a method for dynamic DNS64 implementation comprises receiving, at a network traffic management device, a first DNS response from a DNS server, wherein the first DNS response is compliant with Internet Protocol version 4 (IPv4). The first DNS response corresponds to a first DNS request from a client device wherein the first DNS request is compliant with Internet Protocol version 6 (IPv6). The method includes designating a network gateway device to handle a non-DNS request from the client device to receive a resource from a server. The method includes modifying, at the network traffic management device, the first DNS response into a second DNS response that is compliant with IPv6. The modification is done by attaching a prefix to the first DNS response such that the second DNS response is in compliance with IPv6. The prefix includes at least one bit identifying the designated network gateway device which will handle the non-DNS request between the client device and the server. The method includes sending, from the network traffic management device, the second DNS response to the requesting client device.

A non-transitory computer readable medium having stored thereon instructions for dynamic DNS implementation. The medium comprises processor executable code which, when executed by at least one processor, causes the processor to receive a first DNS response from a DNS server. The first DNS response is compliant with Internet Protocol version 4 (IPv4) and corresponds to a DNS request from a client device, wherein the DNS request is compliant with Internet Protocol version 6 (IPv6). The processor is configured to designate a network gateway device to handle a non-DNS request from the client device to receive a resource from a server. The processor is configured to modify the first DNS response into a second DNS response that is compliant with IPv6 by adding a prefix to the first DNS response such that the second DNS response is in compliance with IPv6. At least one bit in the prefix identifies the designated network gateway device which will handle the non-DNS request between the client device and the server. The processor is configured to send the second DNS response to the requesting client device.

In an aspect, a network traffic management device comprises a network interface capable of receiving and transmitting network data packets over one or more networks. The device comprises a memory configured to store one or more programming instructions. The device comprises at least one of configurable hardware logic configured to be capable of implementing and a processor coupled to the memory and configured to execute programmed instructions stored in the memory which causes the processor to receive a first DNS response from a DNS server. The first DNS response is compliant with Internet Protocol version 4 (IPv4). The first DNS response corresponds to a DNS request from a client device that is compliant with Internet Protocol version 6 (IPv6). The processor is configured to designate a network gateway device to handle a non-DNS request from the client device to receive a resource from a server. The processor is configured to modify the first DNS response into a second DNS response that is compliant with IPv6 by adding a prefix to the first DNS response such that the second DNS response is in compliance with IPv6. At least one bit in the prefix identifies the designated network gateway device which will handle the non-DNS request between the client device and the server. The processor is configured to send the second DNS response from the network traffic management device to the requesting client device.

In one or more of the above aspects, a non-DNS request is received from the client device, wherein the non-DNS request includes information identifying the network gateway device. The non-DNS request is then routed through the identified network gateway device to the server.

In one or more of the above aspects, the DNS request is received from the client device, wherein the DNS request is compliant with IPv6. The DNS request is converted into a DNS request is compliant with IPv4. The IPv4 compliant DNS request is then sent to the IPv4 DNS server.

In one or more of the above aspects, a plurality of bits that at least partially form the prefix of the IPv6 compliant DNS request are removed, wherein removal of the plurality of bits results in the second request being compliant with the IPv4.

In one or more of the above aspects, wherein the client device is an IPv6 type device and the DNS server is an IPv4 type device.

In one or more of the above aspects, at least one operating parameter of one or more network gateway devices of a plurality of network gateway devices that are capable of being in communication with the client device is determined, wherein the designated network gateway device handles and communicates the non-DNS request from the client device based on a load balancing decision performed by the network traffic management device. Address information of the designated network gateway device is incorporated into the prefix attached to the first DNS response in converting the first DNS response to the second DNS response. In an aspect, the at least one operating parameter may be a policy rule. In another aspect, the at least one operating parameter may be an availability metric comprising at least one of a load metric, a connection metric, a client device location metric, network topology information, and a connection persistence metric.

In one or more of the above aspects, availability metrics are sent to other network gateway devices in the plurality of network gateway devices; and a plurality of availability metrics associated with the other network gateway devices are updated, wherein the plurality of availability metrics are capable of being used for attaching prefixes to subsequent DNS responses from the DNS server.

These and other advantages, aspects, and features will become more apparent from the following detailed description when viewed in conjunction with the accompanying drawings. Non-limiting and non-exhaustive examples are described with reference to the following drawings. Accordingly, the drawings and descriptions below are to be regarded as illustrative in nature, and not as restrictive or limiting.

DETAILED DESCRIPTION

In general, the present disclosure describes and enables a system, computer readable medium, and device for dynamically selecting a prefix having a plurality of bits used in DNS64 converters to load balance IPv6 client devices to the best NAT64 network gateway device for their IPv4 server connections. For example, client devices operating in an IPv6 only environment need to communicate with DNS servers operating in an IPv4 only environment. A network traffic management device 110 performs one or more load balancing techniques to select a network gateway device (e.g. NAT64 device) that would handle subsequent non-DNS requests from the client device. The selected network gateway device is identified by the network traffic management device 110 in one or more bits of the attached IPv6 prefix. Network traffic management device 110 provides efficient load balancing based conversion from one environment to another, thereby boosting network performance while at the same time maintaining IPv6-IPv4 compliance.

Figure 1:
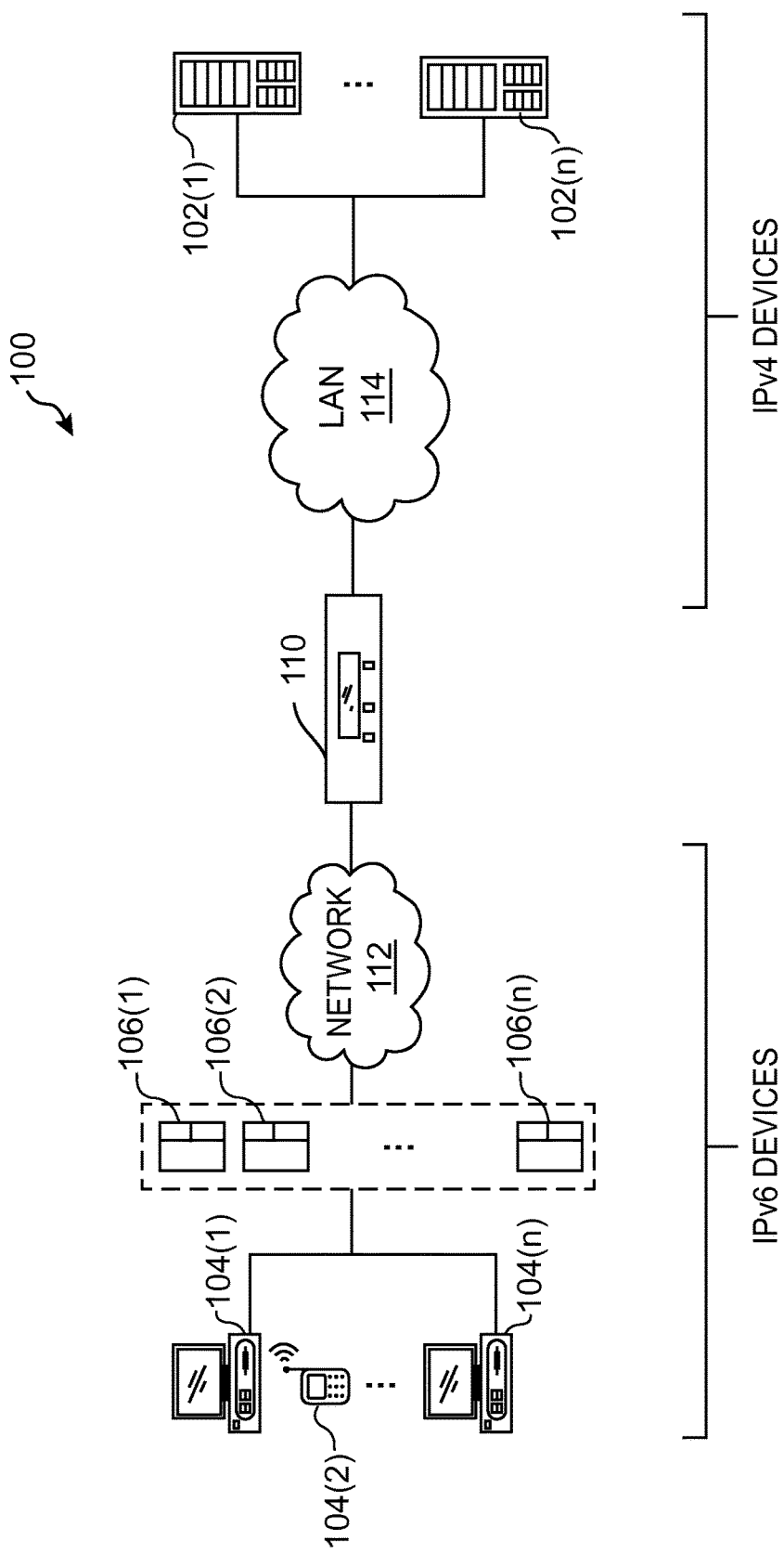
FIG. 1 illustrates an exemplary network system environment using a network traffic management device for dynamic DNS64 implementation in accordance with an aspect of the present disclosure.

FIG. 1 illustrates an exemplary network system environment using a network traffic management device for dynamic DNS64 implementation in accordance with an aspect of the present disclosure. In particular, FIG. 1 illustrates an exemplary network system 100 that comprises a plurality of network devices, including one or more client devices 104(1)-104(n), one or more servers 102(1)-102(n) (e.g. DNS server), one or more network gateway devices (e.g. NAT64 gateway devices) 106(1)-106(n) and one or more network traffic management devices 110. It should also be noted that although two server devices 102(1) and 102(n) are shown, any number of server devices 102 can be implemented in the system 100. Likewise, although three client devices 104(1), 104(2), 104(n) and one network traffic management device 110 are shown in FIG. 1, any number of client devices and network traffic management devices can be implemented in the system 100. Although network 112 and LAN 114 are shown, other numbers and types of networks could be used. The ellipses and the designation "n" denote an unlimited number of server devices and client devices, respectively.

By way of example only, responses and requests are sent over the network 112 according to Hyper-Text Transfer Protocol (HTTP) based applications, various request for comments (RFC) document guidelines or the Common Internet File System (CIFS) or network file system (NFS) protocols. It should be noted that the principles discussed herein are not limited to these examples and can include other application protocols and other types of requests (e.g., File Transfer Protocol (FTP) based requests).

Client devices 104(1)-104(n) are coupled to one or more network traffic management devices 110 via a plurality of network gateway devices 106(1)-106(n), whereby each network gateway device 106 has a unique 128 bit IPv6 address. The client devices 104(1)-104(n) are configured to send DNS based and non-DNS based requests to corresponding servers 102(1)-102(n). DNS based client requests include requests to obtain DNS information from a DNS client service or a DNS server 102. Non-DNS based requests are all other web based or non-web based requests sent from the client device 104 to a destination server. It should be noted that the non-DNS based request may be any web or non-web based request sent from the client device(s) 104. The network traffic management device 110 is interposed between one or more servers (e.g. DNS server) 102(1)-102(n) and one or more client devices 104(1)-104(n), whereby the network traffic management device 110 provides one or more communication channels via network 112 and Local Area Network (LAN) 114. It should be noted that other communication channels may be directly established between various network devices in the system 100 without network 112 and/or LAN 114.

Client devices 104(1)-104(n) can include virtually any network device capable of connecting to another network device to send and receive information, including Web-based information. Client devices 104(1)-104(n) can typically connect using a wired (and/or wireless) communications medium and comprise personal computers (e.g., desktops, laptops, tablets), stand alone boxes, smart TVs, mobile and smart phones and the like, as illustrated in FIG. 1. In this example, the client devices can run browsers and other types of applications (e.g., web-based applications) that provide an interface to make one or more requests to different server-based applications via network 112.

In an aspect, network devices 106(1)-106(n) are NAT64 gateway devices, although other types of load balancers with network address translation or NAT capabilities and/or additional capabilities may be used. The client devices 104(1)-104(n) can be further configured to engage in a secure communication directly with the network traffic management device 110 and/or the servers 102(1)-102(n), via plurality of the network devices 106, or otherwise, using mechanisms such as Secure Sockets Layer (SSL), Internet Protocol Security (IPSec), Transport Layer Security (TLS), and the like.

Servers 102(1)-102(n) comprise one or more server computing machines or devices capable of operating one or more Web-based and/or non Web-based applications that may be accessed by other network devices, such as client devices 104(1)-104(n), network gateway device 106(1)-106(n), and network traffic management device(s) 110. The servers 102(1)-102(n) may provide data that are in the form of responses to client requests. In an aspect, one or more servers 102 are DNS servers, whereby the responses sent from the DNS server include, but are not limited to, domain name services and zones. In an aspect, the one or more DNS servers are configured to store DNS records for domain names, such as address records, name server records, mail exchanger records and the like. It is to be understood that the servers 102(1)-102(n) can be hardware-based and/or can execute software supported by the hardware to perform its necessary functions.

In an aspect, one or more of the servers 102(1)-102(n) are servers which provide particular Web page(s) corresponding to URL request(s), image(s) of physical objects, and any other objects, services or resources requested by the client device. One or more of the servers 102(1)-102(n) can represent a system comprising of multiple servers which can include internal or external networks. A series of Web-based and/or other types of protected and unprotected network applications can run on servers 102(1)-102(n) that the servers to transmit data messages in response to requests sent from the client devices 104(1)-104(n).

In the example shown in FIG. 1, at least one of the DNS servers 102(1)-102(n) is an IPv4 only device that caters to various 'A' requests made by client devices 104(1)-104(n).

The client devices 104(1)-104(n), in the example run interface applications such as Web browsers that provide an interface to make requests for and send data, including IPv6 requests, to one or more servers 102(1)-102(n) via one or more network gateway devices 106(1)-106(n). For example, as per the Transmission Control Protocol (TCP), data packets can be sent to the servers 102(1)-102(n) from the requesting client devices 104(1)-104(n), although other protocols (e.g., FTP) may be used.

In an aspect, network 112 comprises a publicly accessible network, such as the Internet, although network 112 may comprise other types of private and public networks that include other devices. Communications, such as requests from client devices 104(1)-104(n) and responses from servers 102(1)-102(n), take place over network 112 according to standard network protocols, such as the HTTP and TCP/IP. It should be noted, however, that the principles discussed herein are not limited to these protocols and can include other protocols (e.g., FTP). Further, network 112 can include local area networks (LANs), wide area networks (WANs), direct connections, other types and numbers of network types, and any combination thereof. On an interconnected set of LANs or other networks, including those based on different architectures and protocols, routers, switches, hubs, gateways, bridges, crossbars, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links, optical fibers, and other communications links known to those of ordinary skill in the relevant arts. Generally, network 112 includes any communication medium and method by which data may travel between client devices 104(1)-104(n), servers 102(1)-102(n), and network traffic management device 110.

By way of example only and not by way of limitation, LAN 114 comprises a private local area network that includes the network traffic management device 110 coupled to the one or more servers 102(1)-102(n), although the LAN 114 may comprise other types of private and public networks with other devices. Networks, including local area networks, besides being understood by those of ordinary skill in the relevant art(s), have already been described above in connection with network 112, and thus will not be described further here.

As shown in the example environment of the network system 100 depicted in FIG. 1, the network traffic management device 110 can be interposed between the network 112 and the servers 102(1)-102(n) coupled via LAN 114 as shown in FIG. 1. Again, the network system 100 could be arranged in other manners with other numbers and types of devices. Also, the network traffic management device 110 is coupled to network 112 by one or more network communication links, and intermediate network devices, such as routers, switches, gateways, hubs, crossbars, and other devices. It should be understood that the devices and the particular configuration shown in FIG. 1 are provided for exemplary purposes only and thus are not limiting. Although a single network traffic management device 110, additional network traffic management devices may be coupled in series and/or parallel to the network traffic management device 110, thereby forming a cluster, depending upon specific applications, and the single network traffic management device 110 shown in FIG. 1 is by way of example only, and not by way of limitation.

Generally, the network traffic management device 110 manages network communications, which may include one or more client requests and server responses, to/from the network 112 between the client devices 104(1)-104(n) and one or more of the servers 102(1)-102(n) via LAN 114. These requests may be destined for one or more servers 102(1)-102(n), and, as alluded to earlier, may take the form of one or more TCP/IP data packets originating from the network 112, passing through one or more intermediate network devices and/or intermediate networks, until reaching the network traffic management device 110, for example.

Further, it is to be noted although the network traffic management device 110 is shown separate from the plurality of network gateway devices 106 in FIG. 1, it is contemplated that the network traffic management device 110 can be configured to perform the functions of one or more of the plurality of network devices 106, itself. In particular to this example, the network traffic management device 110 may be configured to gather information or availability metrics of one or more network gateway devices (e.g. NAT64 gateway devices) 106, whereby the network traffic management device 110 sends its own information or availability metrics to other network gateway devices 106. The availability metrics are exchanged between the network gateway devices 106(1)-106(n), and the network traffic management device 110 is updated at different time periods to allow it to perform accurate load balancing techniques by attaching prefixes that identify and select one or more preferred network gateway devices 106 at any given time.

In addition, as discussed in more detail with reference to FIGS. 2-3, the network traffic management device 110 is configured to provide dynamic DNS64 implementation for load balancing and/or other purposes. In any case, the network traffic management device 110 may manage network communications by performing several network traffic management related functions involving network communications, secured or unsecured, such as load balancing, access control, VPN hosting, network traffic acceleration, encryption, decryption, cookie management, key management and dynamic DNS64 implementations in accordance with the present disclosure.

Figure 2:
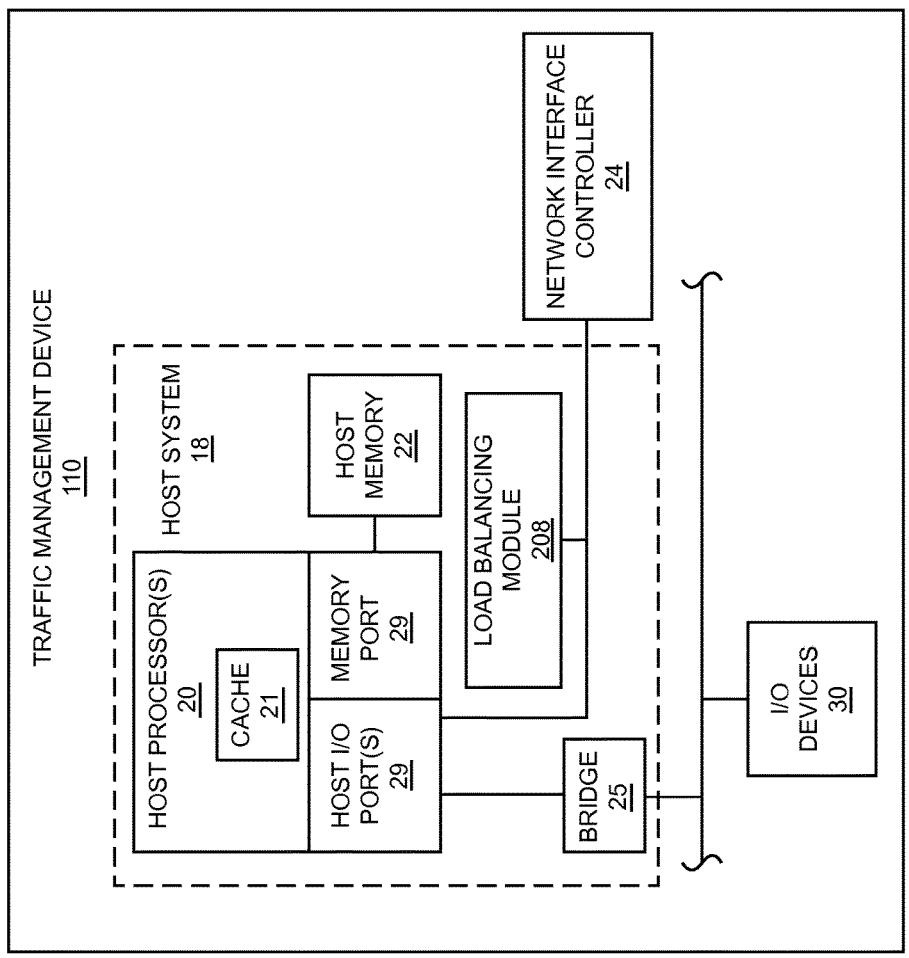
FIG. 2 is a partly schematic and partly functional block diagram of the network traffic management device in the exemplary network environment of FIG. 1 in accordance with an aspect of the present disclosure.

Referring to FIG. 2, an exemplary network traffic management device 110 is illustrated in accordance with an aspect of the present disclosure. Included within the network traffic management device 110 is a system bus 26 that communicates with a host system 18 via a bridge 25 and with an input-output (I/O) device 30. In this example, a single I/O device 30 is shown to represent any number of I/O devices connected to bus 26. In one example, bridge 25 is in further communication with a host processor 20 via host input output (I/O) ports 29. Host processor 20 can further communicate with a network interface controller 24 via a CPU bus 202, a host memory 22 (via a memory port 53), and a cache memory 21. As outlined above, included within the host processor 20 are host I/O ports 29, memory port 53, and a main processor (not shown separately).

In this example, host system 18 includes a software load balancing module 208 that includes algorithms and instructions/code stored thereupon, when executed by the processor 20, causes it to analyze various availability metrics obtained from the plurality of network gateway devices 106. Based on its analysis, the module 208 selects one or more network gateway devices 106 through which subsequent client requests are to be routed. The network traffic management device 110 generates a prefix, such as a 96-bit or other bit size prefix, identifying that one or more designated network gateway device, whereby the prefix is attached to the DNS response to convert the 'A' DNS (IPv4) response into an 'AAAA' DNS (IPv6) compliant response.

In an aspect, the network traffic management device 110 can include the host processor 20 characterized by any one of the following component configurations: computer readable medium and logic circuits that respond to and process instructions fetched from the host memory 22; a microprocessor unit, such as: those manufactured by Intel Corporation of Santa Clara, Calif.; those manufactured by Motorola Corporation of Schaumburg, Ill.; those manufactured by Transmeta Corporation of Santa Clara, Calif.; the RS/6000 processor such as those manufactured by International Business Machines of Armonk, N.Y.; a processor such as those manufactured by Advanced Micro Devices of Sunnyvale, Calif.; or any other combination of logic circuits capable of executing the systems and methods described herein. Still other examples of the host processor 20 can include any combination of the following: a microprocessor, a microcontroller, a central processing unit with a single processing core, a central processing unit with two processing cores, or a central processing unit with more than one processing core.

Examples of the network traffic management device 110 include one or more application delivery controller devices of the BIG-IP® product family provided by F5 Networks, Inc. of Seattle, Wash., although other types of network traffic management devices may be used. In an exemplary structure and/or arrangement, network traffic management device 110 can include the host processor 20 that communicates with cache memory 21 via a secondary bus also known as a backside bus, while another example of the network traffic management device 110 includes the host processor 20 that communicates with cache memory 21 via the system bus 26. The local system bus 26 can, in some examples, also be used by the host processor 20 to communicate with more than one type of I/O devices 30. In some examples, the local system bus 26 can be anyone of the following types of buses: a VESA VL bus; an ISA bus; an EISA bus; a Micro Channel Architecture (MCA) bus; a PCI bus; a PCI-X bus; a PCI-Express bus; or a NuBus.

Still other versions of the network traffic management device 110 include host processor 20 connected to I/O device 30 via any one or more of the following connections: HyperTransport, Rapid I/O, or InfiniBand. Further examples of the network traffic management device 110 include a communication connection where the host processor 20 communicates with one I/O device 30 using a local interconnect bus and with a second I/O device (not shown separately) using a direct connection.

As described above, included within some examples of the network traffic management device 110 is each of host memory 22 and cache memory 21. Examples include cache memory 21 and host memory 22 that can be anyone of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein.

The host memory 22 and/or the cache memory 21 can, in some examples, include one or more memory devices capable of storing data and allowing any storage location to be directly accessed by the host processor 20. Such storage of data can be in a local database internal to network traffic management device 110, or external to network traffic management device 110 coupled via one or more input output ports of network interface controller 24. Further examples of network traffic management device 110 include a host processor 20 that can access the host memory 22 via one of either: system bus 26; memory port 53; or any other connection, bus or port that allows the host processor 20 to access host memory 22.

One example of the network traffic management device 110 provides support for anyone of the following installation devices: ZIP disks, a CD-ROM drive, a CD-R/RW drive, a DVD-ROM drive, tape drives of various formats, USB device, a bootable medium, a bootable CD, a bootable compact disk (CD) for GNU/Linux distribution such as KNOPPIX®, a hard-drive or any other device suitable for installing applications or software. Applications can, in some examples, include a client agent, or any portion of a client agent. The network traffic management device 110 may further include a storage device (not shown separately) that can be either one or more hard disk drives, or one or more redundant arrays of independent disks; where the storage device is configured to store an operating system, software, programs applications, or at least a portion of the client agent. A further example of the network traffic management device 110 includes an installation device that is used as the storage device.

Furthermore, the network traffic management device 110 can include network interface controller 24 to communicate, via an input-output port inside network interface controller 24, with a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, optical connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the network traffic management device 110 includes network interface controller 24 configured to communicate with additional computing devices via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Versions of the network interface controller 24 can comprise anyone of: a built-in network adapter; a network interface card; a PCMCIA network card; a card bus network adapter; a wireless network adapter; a USB network adapter; a modem; or any other device suitable for interfacing the network traffic management device 110 to a network capable of communicating and performing the methods and systems described herein.

In various examples, the network traffic management device 110 can include any one of the following I/O devices 30: a keyboard; a pointing device; a mouse; a gesture based remote control device; a biometric device; an audio device; track pads; an optical pen; trackballs; microphones; video displays; speakers; or any other input/output device able to perform the methods and systems described herein. Host I/O ports 29 may in some examples connect to multiple I/O devices 30 to control the one or more I/O devices 30. Some examples of the I/O devices 30 may be configured to provide storage or an installation medium, while others may provide a universal serial bus (USB) interface for receiving USB storage devices such as the USB Flash Drive line of devices manufactured by Twintech Industry, Inc. Still other examples of an I/O device 30 may be bridge 25 between the system bus 26 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

The operation of example processes for providing dynamic DNS64 implementation using the network traffic management device 110 shown in FIGS. 1-2, will now be described with respect to the flowchart 300 shown in FIG. 3 In this example, the machine readable instructions comprise an algorithm for execution by: (a) a processor (e.g., host processor 20), (b) a controller, and/or (c) one or more other suitable processing device(s) within host system 18. Although the process is described with reference to the flowchart shown in FIG. 3, it should be noted that other methods of implementing the example machine readable instructions may alternatively be used. For example, the order of execution of the blocks in flowchart 300 may be changed, and/or some of the blocks described may be changed, eliminated, or combined.

Figure 3:
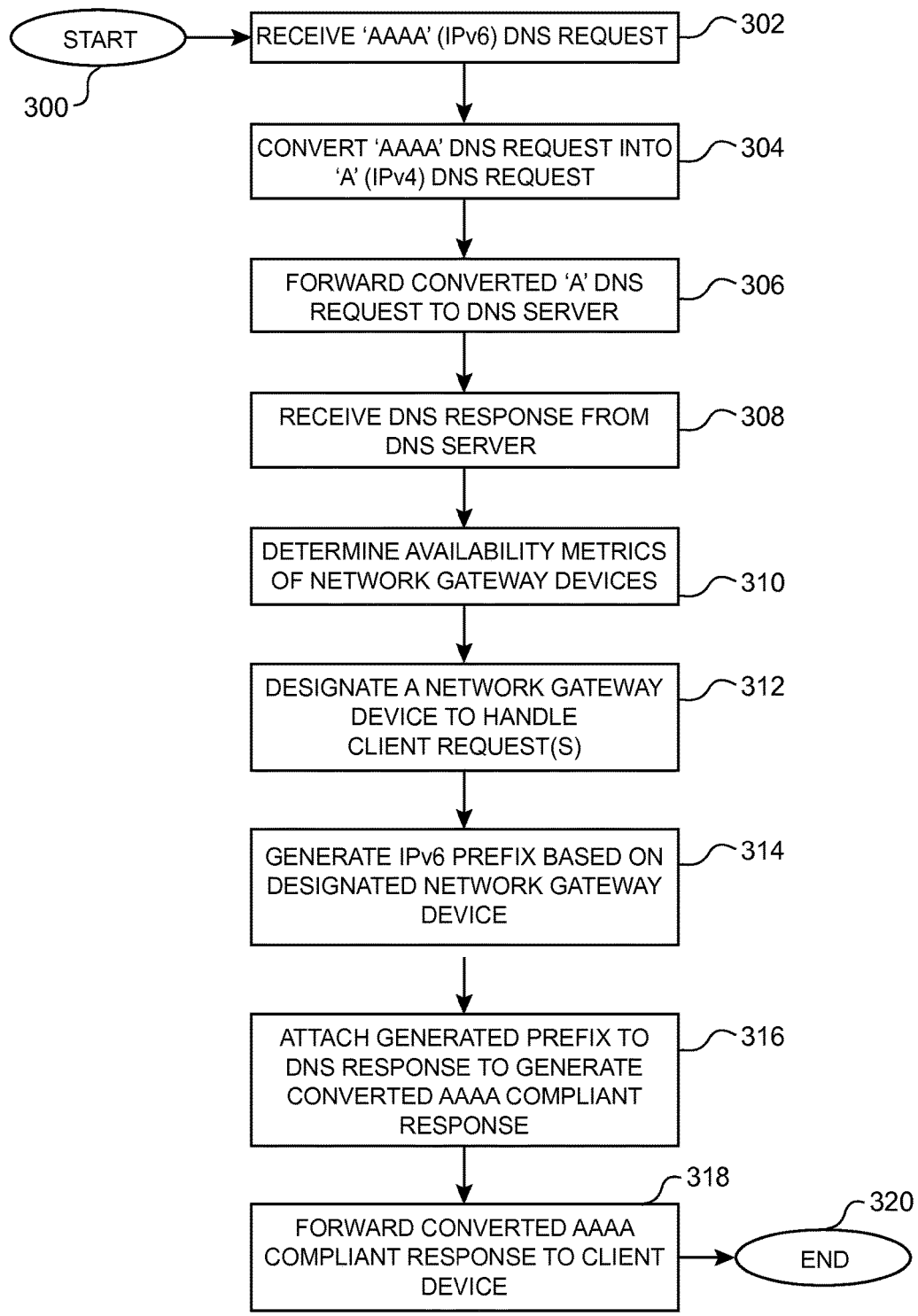
FIG. 3 is a flow chart of an exemplary process and method for dynamic DNS64 implementation in accordance with an aspect of the present disclosure.

With respect to the flowchart in FIG. 3, the process begins when a client device 104 that is trying to access a service from one or more servers 102, sends a DNS request to a DNS server 102 (Block 300). In the example in FIG. 3, the DNS request is intercepted by the network traffic management device 110, in which the DNS request is compliant with the IPv6 protocol (also referred to as a 'quad A' or 'AAAA' query) (Block 302). However, in the example, the DNS server 102 may only be compliant with the IPv4 protocol and thus only accept 'A' record query. Accordingly, DNS responses sent back from such a DNS server 102 are in compliance with the IPv4 protocol. Since respective standard formats of 'AAAA' IPv6 and 'A' IPv4 requests/queries are known to those of ordinary skill in the art, they are not being described herein in detail.

In the example shown in FIG. 3, the network traffic management device 110 converts the client device's 104 DNS request, received in the AAAA format in accordance with the IPv6 protocol, into an IPv4 DNS request for an A record that can be understood by the IPv4 DNS server 102 (Block 304). In particular, in converting the DNS request, the network traffic management device 110 removes one or more bits and/or headers that are part of the 96-bit prefix of the 'AAAA' (IPv6) address format to put the DNS request into the 'A' (IPv4) format. It is to be noted although in this example a 96-bit prefix is being referred to, the examples disclosed herein are equally valid for other bit sized prefixes (128 bit and the like), and the number 96 is being used to accommodate standard IPv6 address format, by way of example only and not by way of limitation. After converting the DNS request from the 'AAAA' (IPv6) format to the 'A'

(IPv4) format, the network traffic management device 110 forwards the converted 'A' DNS request \to the appropriate one or more DNS servers 102(1)-102(n) (Block 306).

As shown in FIG. 3, the network traffic management device 110 thereafter receives a DNS response from the DNS server 102 which initially received the 'A' DNS request in Block 306 (Block 308). If the received DNS response from the DNS server 102 is in the 'AAAA' (IPv6) format, the network traffic management device 110 simply forwards the DNS response to the requesting client device 104.

However, if the received DNS response is in the IPv4 format and/or has an 'A' resource record, the network traffic management device 110 determines and utilizes availability metrics of network devices (e.g. NAT64 gateway devices) 106(1)-106(n) to form an IPv6 compliant response, as discussed below in greater detail (Block 310).

In an exemplary scenario, the network traffic management device 110 can be configured to function as a global load balancer. In this scenario, the network traffic management device 110 communicates with the plurality of NAT64 network gateway devices 106(1)-106(n) to obtain availability metrics of the NAT64 gateway devices 106(1)-106(n). Additionally or optionally, the NAT64 gateway devices can communicate their availability metrics with one another as well. Each NAT64 gateway device 106(1)-106(n) has an IPv6 address (e.g., denoted by 200x::0/32, where '200x' is the 96-bit prefix in which 'x' represents the number of the device, and '0/32' indicates a value of the 32-bit IPv4 address). The load balancing module 208 of the network traffic management device 110 dynamically selects one of the NAT64 gateway devices 106(1)-106(n) based upon availability metrics of the gateway devices. For example, the load balancing module 208 of the network traffic management device 110 may select a NAT64 gateway device that has the least amount of load and modify t the IPv6 DNS response designating that NAT64 gateway device which is to handle subsequent non-DNS requests from the client device 104.

This determination by the network traffic management device of which NAT64 device is to be designated is dynamic and in real-time as the 'A' IPv4 server responses are received at the network traffic management device 110. In particular, the network traffic management device 110 analyzes the availability metrics of the NAT64 gateway devices 106(1)-106(n) and accordingly attaches the prefix bits identifying the selected NAT64 gateway device to the modified IPv6 DNS response so that subsequent non-DNS requests from the client device 104 can be directed to that designated NAT64 gateway device which has the matching IPv6 address.

It is to be noted that designation of a particular NAT64 gateway device is not fixed since for another request from the same client device, the network traffic management device 110 may determine a different NAT64 gateway device to be a better candidate for servicing that request based upon the availability metrics that are available at that time, and may attach the 96-bit prefix in the DNS response which identifies a different NAT64 gateway device for a subsequent web-base request from the client device 104.

Network traffic management device 110 can monitor all of the NAT64 gateway devices 106(1)-106(n) through their respective IPv6 addresses to obtain metrics and availability information and can then pick the most appropriate a 200x:: 0/32-bit prefix to create the 'AAAA' DNS (IPv6) response identifying the best NAT64 gateway device that is currently available. In some examples, the network traffic management device 110 can reduce the Time-To-Live value of the generated 'AAAA' DNS response reduced to a lower value to maintain high availability. Optionally or additionally, multiple 'AAAA' DNS (IPv6) responses can be returned, reordered or reused based on the viability of each of the endpoints (i.e., NAT64 gateway devices) on the network 112.

Returning back to FIG. 3, in the event that the IPv4 response received at the network traffic management device 110 has an 'A' record address x.x.x.x, the value of x can vary over an 8-bit value from 00000000 to 11111111. This 'A' record address format (i.e. x.x.x.x) would not be sufficient in identifying one or more particular network gateway devices (e.g. NAT64 gateway devices) 106(1)-106(n) that should service subsequent non-DNS requests from the client device 104.

In contrast to conventional technologies that attach a static 96-bit prefix to the server response, the load balancing module 208 of the network traffic management device 110 determines availability metrics of one or more network gateway devices (e.g. NAT64 gateway devices) 106(1)-106(n) and selects or designates one or more network gateway device 106 to receive the subsequent non-DNS client requests (Block 312).

In one example, these parameters can include a policy rule that determines which one of the network gateway devices (e.g. NAT64 gateway devices) 106(1)-106(n) and/or network traffic management device 110 can be selected, and then attaching the prefix based upon the policy rule. In an aspect, some or all of the added bits provide identifying information of the network gateway device which is designated to handle subsequent non-DNS requests from the client device 104.

Alternatively or additionally, these parameters may include one or more availability metrics. By way of example only, the availability metrics can include one or more of a load metric, a connection metric, a client device location metric, network topology information, and a connection-persistence metric, although other availability metrics may be used. A load metric can indicate, for example, the amount of traffic experienced by each of the network devices (e.g. NAT64 gateway devices) 106(1)-106(n) as well as the network traffic management device 110. A connection metric can indicate, for example, a numerical value corresponding to a number of connections being handled by each of network gateway devices (e.g. NAT64 gateway devices) 106(1)-106(n) and by the network traffic management device 110. Alternatively or additionally, the connection metric may indicate the number of connections being handled at one or more DNS servers 102(1)-102(n). A client device location metric can indicate, for example, a geographical location of the requesting client device 104, whereby the network traffic management device 110 generates the IPv6 prefix identifying the network gateway device (e.g. NAT64 gateway device) 106 that is most closely located, geographically, to the client device 104. Similarly, a network topology metric can indicate, for example, an arrangement of various network devices (e.g. NAT64 gateway devices) 106(1)-106(n) that are best available to handle the response from DNS servers 102(1)-102(n). A connection persistence metric can include, for example, a duration of time for which each of the network devices (e.g. NAT64 gateway devices) 106(1)-106(n) and the network traffic management device 110 service one or more connections from requesting one or more of client devices 104(1)-104(n). In an aspect, one or more network devices (e.g. NAT64 gateway devices) 106 as well as the network traffic management device 110, can continuously monitor and gather availability metrics of other gateway devices for this determination.

Upon selecting or designated the network gateway device 106, the network traffic management device 110 generates a x-bit prefix that contains the requisite information data to enable, identify and route subsequent client non-DNS requests to the designated server 102 via the identified network gateway device(s) 106 (e.g. NAT64 gateway device) based upon one or more parameters (Block 314). It is to be noted although in this example a 96-bit prefix is being referred to, the examples disclosed herein are equally valid for other bit sized prefixes (128 bit and the like), and the number 96 is being used to accommodate standard IPv6 address format, by way of example only and not by way of limitation.

As shown in FIG. 3, the network traffic management device 110 thereafter attaches the generated prefix the designated network gateway device 106(1)-106(n) to the received 'A' DNS (IPv4) server response to generate a converted or modified 'AAAA' compliant response (Block 316). It is to be noted, for subsequent server responses, the network traffic management device 110 may continue determining which gateway device 106(1)-106(n) is best suited to handle each DNS response to be sent to the client devices 104(1)-104(n), and accordingly dynamically generate and attach prefixes to the IPv4 responses as they are received.

As shown in FIG. 3, the network traffic management device 110 thereafter forwards the converted 'AAAA' (IPv6) compliant response to the appropriate requesting client device 104 (Block 318). The process then ends at Block 320. At least a portion of the prefix, which contains the identify of the designated network gateway device 106, may be stored as a cookie in the client device 104, whereby that identifying information is contained in subsequent non-DNS requests from the client device 104.

Figure 4:
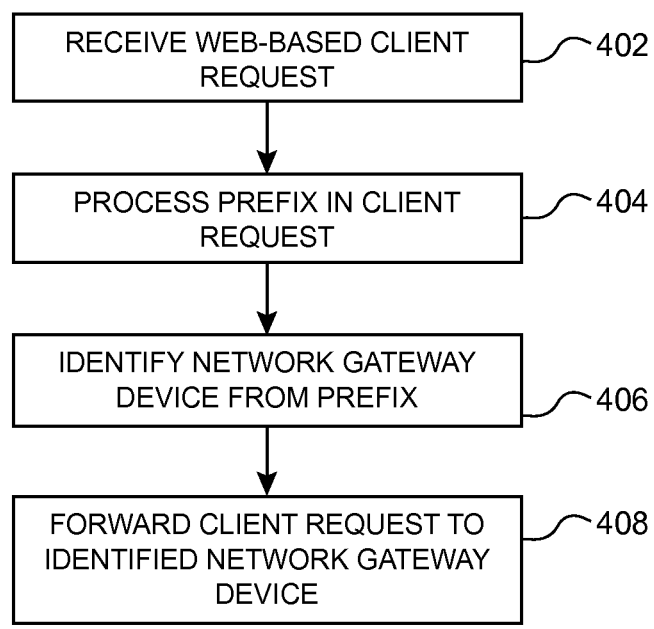
FIG. 4 is a flow chart of an exemplary process of processing a non-DNS request within the dynamic DNS64 implementation in accordance with an aspect of the present disclosure.

FIG. 4 illustrates a flow chart of an exemplary process of processing a non-DNS request within the dynamic DNS64 implementation in accordance with an aspect of the present disclosure. As shown in FIG. 4, subsequent non-DNS request(s) sent from the client device 104 is received at the network traffic management device 110 (Block 402). It should be noted that the non-DNS based request may be any web or non-web based request sent from the client device(s) 104. In an aspect, these requests contain information, preferably in the form of a cookie, JavaScript, or other means, identifying the network gateway device 106 in the prefix.

The network traffic management device 110 processes the information in the prefix of the non-DNS request (Block 404). From processing the information in the prefix, the network traffic management device 110 is able identify the network gateway device 106 which is to handle the non-DNS request (Block 406). Thereafter, the network traffic management device routes the non-DNS request to the destination server 102 via the identified network gateway device 106. Accordingly, this technology can more efficiently and dynamically load balance IPv6 requests based upon availability metrics that identify the best network gateway device 106 that can service subsequent requests from client devices 104(1)-104(n) (e.g., 3G or 4G mobile telephones).

Having thus described the basic concepts, it will be rather apparent to those skilled in the art that the foregoing detailed disclosure is intended to be presented by way of example only and is not limiting. Various alterations, improvements, and modifications will occur and are intended to those skilled in the art, though not expressly stated herein. The order that the measures and processes for implementing dynamically DNS64 are implemented can also be altered. Furthermore, multiple networks in addition to network 112 and LAN 114 could be associated with network traffic management device 110 from/to where network packets can be received/transmitted, respectively. These alterations, improvements, and modifications are intended to be suggested by this disclosure, and are within the spirit and scope of the examples. Additionally, the recited order of processing elements or sequences, or the use of numbers, letters, or other designations therefore, is not intended to limit the claimed processes and methods to any order except as can be specified in the claims.

What is claimed is:

1. A method for dynamic DNS implementation, the method comprising:
   receiving, by a network traffic management device, a first DNS response from a DNS server, wherein the first DNS response is compliant with Internet Protocol version 4 (IPv4), wherein the first DNS response corresponds to a DNS request received from a client device and the DNS request is compliant with Internet Protocol version 6 (IPv6);
   obtaining, by the network traffic management device, from an identifier associated with each of a plurality of network gateway devices at least one of a plurality of different availability metrics associated with each of the plurality of network gateway devices upon receiving the first DNS response from the DNS server, wherein the network gateway devices comprise Network Address Translation 64 (NAT64) devices configured to facilitate communication between the client device that is IPv6 compliant and a server that is IPv4 compliant;
   selecting, by the network traffic management device, based on one or more policy rules associated with the at least one of the plurality of different availability metrics, one of the network gateway devices to handle a non-DNS request from the client device;
   modifying, by the network traffic management device, the first DNS response to generate a second DNS response that is compliant with IPv6, the modifying comprising at least appending a prefix to the first DNS response such that the second DNS response is in compliance with IPv6, wherein the prefix includes a network address of the selected one of the network gateway devices that will handle the non-DNS request; and
   sending, by the network traffic management device, the second DNS response to the client device.

2. The method of claim 1 further comprising:
   receiving, by the network traffic management device, the non-DNS request from the client device, wherein the non-DNS request includes the network address of the selected one of the network gateway devices; and
   sending, by the network traffic management device, the non-DNS request to the selected one of the network gateway devices based on the network address of the selected one of the network gateway devices included in the non-DNS request.

3. The method of claim 1 further comprising:
   receiving, by the network traffic management device, the DNS request from the client device, wherein the DNS request is compliant with IPv6;
   converting, by the network traffic management device, the DNS request into a DNS request that is compliant with IPv4; and sending, by the network traffic management device, the IPv4 compliant DNS request to the DNS server, wherein the DNS server is an IPv4 device.

4. The method of claim 3, wherein converting the IPv6 compliant DNS request into the IPv4 compliant DNS request further comprises removing a plurality of bits form the prefix of the IPv6 compliant DNS request.

5. The method of claim 1, wherein the at least one of the plurality of different availability metric includes a client device location metric or network topology metric and wherein the client device is an IPv6 type device and the DNS server is an IPv4 type device.

6. A non-transitory computer readable medium having stored thereon instructions for dynamic DNS implementation, comprising executable code which when executed by one or more processors, causes the one or more processors to:
   receive a first DNS response from a DNS server, wherein the first DNS response is compliant with Internet Protocol version 4 (IPv4), wherein the first DNS response corresponds to a DNS request received from a client device and the DNS request is compliant with Internet Protocol version 6 (IPv6);
   obtain from an identifier associated with each of a plurality of network gateway devices at least one of a plurality of different availability metrics associated with each of the plurality of network gateway devices upon receiving the first DNS response from the DNS server, wherein the network gateway devices comprise Network Address Translation 64 (NAT64) devices configured to facilitate communication between the client device that is IPv6 compliant and a server that is IPv4 compliant;
   select based on one or more policy rules associated with the at least one of the plurality of different availability metrics, one of the network gateway devices to handle a non-DNS request from the client device;
   modify the first DNS response to generate a second DNS response that is compliant with IPv6, the modifying comprising at least appending a prefix to the first DNS response such that the second DNS response is in compliance with IPv6, wherein the prefix includes a network address of the selected one of the network gateway devices that will handle the non-DNS request; and
   send the second DNS response to the client device.

7. The non-transitory computer readable medium of claim 6, wherein the executable code when executed by the one or more processors, further causes the processors to:
   receive the non-DNS request from the client device, wherein the non-DNS request includes the network address of the selected one of the network gateway devices; and
   send the non-DNS request to the selected one of the network gateway devices based on the network address of the selected one of the network gateway devices included in the non-DNS request.

8. The non-transitory computer readable medium of claim 6, wherein the executable code when executed by the one or more processors, further causes the processors to:
   receive the DNS request from the client device, wherein the DNS request is compliant with IPv6;
   convert the DNS request into a DNS request is compliant with IPv4; and
   send the IPv4 compliant DNS request to the DNS server, wherein the DNS server is an IPv4 device.

9. The non-transitory computer readable medium of claim 6, wherein the executable code when executed by the one or more processors, further causes the processors to remove a plurality of bits that at least partially form the prefix of the IPv6 compliant DNS request.

10. The non-transitory computer readable medium of claim 6, wherein the at least one of the plurality of different availability metric includes a client device location metric or network topology metric and wherein the client device is an IPv6 type device and the DNS server is an IPv4 type device.

11. A network traffic management apparatus comprising a memory comprising programmed instructions stored thereon and one or more processors configured to be capable of executing the stored programmed instructions to:
   receive a first DNS response from a DNS server, wherein the first DNS response is compliant with Internet Protocol version 4 (IPv4), wherein the first DNS response corresponds to a DNS request received from a client device and the DNS request is compliant with Internet Protocol version 6 (IPv6);
   obtain from an identifier associated with each of a plurality of network gateway devices at least one of a plurality of different availability metrics associated with each of the plurality of network gateway devices upon receiving the first DNS response from the DNS server, wherein the network gateway devices comprise Network Address Translation 64 (NAT64) devices configured to facilitate communication between the client device that is IPv6 compliant and a server that is IPv4 compliant;
   select based on one or more policy rules associated with the at least one of the plurality of different availability metrics, one of the network gateway devices to handle a non-DNS request from the client device;
   modify the first DNS response to generate a second DNS response that is compliant with IPv6, the modifying comprising at least appending a prefix to the first DNS response such that the second DNS response is in compliance with IPv6, wherein the prefix includes a network address of the selected one of the network gateway devices that will handle the non-DNS request; and
   send the second DNS response to the client device.

12. The network traffic management apparatus of claim 11, wherein the one or more processor are further configured to be capable of executing the programmed instructions to:
   receive the non-DNS request from the client device, wherein the non-DNS request includes the network address of the selected one of the network gateway devices; and
   send the non-DNS request to the selected one of the network gateway devices based on the network address of the selected one of the network gateway devices included in the non-DNS request.

13. The network traffic management apparatus of claim 11, wherein the one or more processor are further configured to be capable of executing the programmed instructions to:
   receive the DNS request from the client device, wherein the DNS request is compliant with IPv6;
   convert the DNS request into a DNS request is compliant with IPv4; and
   send the IPv4 compliant DNS request to the DNS server, wherein the DNS server is an IPv4 device.

14. The network traffic management apparatus of claim 11, wherein the one or more processor are further configured to be capable of executing the programmed instructions to remove a plurality of bits that at least partially form the prefix of the IPv6 compliant DNS request.

15. The network traffic management apparatus of claim 11, wherein the at least one of the plurality of different availability metric includes a client device location metric or network topology metric and wherein the client device is an IPv6 type device and the DNS server is an IPv4 type device.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
  receive a first DNS response from a DNS server, wherein the first DNS response is compliant with Internet Protocol version 4 (IPv4), wherein the first DNS response corresponds to a DNS request received from a client device and the DNS request is compliant with Internet Protocol version 6 (IPv6);
  obtain from an identifier associated with each of a plurality of network gateway devices at least one of a plurality of different availability metrics associated with each of the plurality of network gateway devices upon receiving the first DNS response from the DNS server, wherein the network gateway devices comprise Network Address Translation 64 (NAT64) devices configured to facilitate communication between the client device that is IPv6 compliant and a server that is IPv4 compliant;
  select based on one or more policy rules associated with the at least one of the plurality of different availability metrics, one of the network gateway devices to handle a non-DNS request from the client device;
  modify the first DNS response to generate a second DNS response that is compliant with IPv6, the modifying comprising at least appending a prefix to the first DNS response such that the second DNS response is in compliance with IPv6, wherein the prefix includes a network address of the selected one of the network gateway devices that will handle the non-DNS request; and
  send the second DNS response to the client device.

17. The network traffic management system of claim 16, wherein the one or more processors are further configured to be capable of executing the stored programmed instructions to:
  receive the non-DNS request from the client device, wherein the non-DNS request includes the network address of the selected one of the network gateway devices; and
  send the non-DNS request to the selected one of the network gateway devices based on the network address of the selected one of the network gateway devices included in the non-DNS request.

18. The network traffic management system of claim 16, wherein the one or more processors are further configured to be capable of executing the stored programmed instructions to:
  receive the DNS request from the client device, wherein the DNS request is compliant with IPv6;
  convert the DNS request into a DNS request is compliant with IPv4; and
  send the IPv4 compliant DNS request to the DNS server, wherein the DNS server is an IPv4 device.

19. The network traffic management system of claim 16, wherein the one or more processors are further configured to be capable of executing the stored programmed instructions to remove a plurality of bits that at least partially form the prefix of the IPv6 compliant DNS request.

20. The network traffic management system of claim 16, wherein the at least one of the plurality of different availability metric includes a client device location metric or network topology metric and wherein the client device is an IPv6 type device and the DNS server is an IPv4 type device.

* * * * *